(12) United States Patent
Jeffway, Jr. et al.

(10) Patent No.: US 9,011,224 B1
(45) Date of Patent: Apr. 21, 2015

(54) THREE DIMENSIONAL LAMP ARRAY GAME SYSTEM

(71) Applicants: Robert W Jeffway, Jr., Leeds, MA (US); Steven R Casino, Fort Thomas, KY (US); Steven T Fink, Cincinnati, OH (US)

(72) Inventors: Robert W Jeffway, Jr., Leeds, MA (US); Steven R Casino, Fort Thomas, KY (US); Steven T Fink, Cincinnati, OH (US)

( * ) Notice: Subject to any disclaimer, the term of this patent is extended or adjusted under 35 U.S.C. 154(b) by 0 days.

(21) Appl. No.: 13/861,097

(22) Filed: Apr. 11, 2013

Related U.S. Application Data

(60) Provisional application No. 61/623,062, filed on Apr. 11, 2012.

(51) Int. Cl.
*A63F 9/24* (2006.01)
*A63F 13/20* (2014.01)

(52) U.S. Cl.
CPC .................................... *A63F 13/06* (2013.01)

(58) Field of Classification Search
CPC .. G08B 13/02; G08B 21/0269; G08B 25/009; G08B 25/08; G08B 25/10; G08B 13/22; G08B 21/0476; G08B 21/06; G06Q 10/08; G06Q 10/0833; G06Q 50/01; A61B 5/02438; A61B 5/11; A61B 5/681; A61B 5/721; A61B 5/0002; A61B 5/0245; A61B 2562/0219; A61B 5/725; A61B 2503/04; A61B 2560/0412; A61B 2560/0443; A61B 5/0004; A61B 5/0022
See application file for complete search history.

(56) References Cited

U.S. PATENT DOCUMENTS 7,862,415 B1 *  1/2011  Ghaly ............................. 463/9
8,651,953 B2 *  2/2014  Ritter et al. .................. 463/36

* cited by examiner

*Primary Examiner* — Sunit Pandya
(74) *Attorney, Agent, or Firm* — Robert W. J. Usher

(57) ABSTRACT

A hand-held, cubic, transparent game system containing a cubiform array of individual LEDs arranged as a cubic matrix of rows and columns, an inclinometer, sound chip and speaker and a timer. Electronic control circuitry including a game-programmed processor is connected between the inclinometer and the LED array to control visible operating states of individual lamps in response to output signals from the inclinometer, according to rules of a game program. Sequential LEDs in a direction of inclination are momentarily flashed to define a traveling cursor. Turning the housing through 90 degrees transfers cursor between a row and a column.

15 Claims, 9 Drawing Sheets

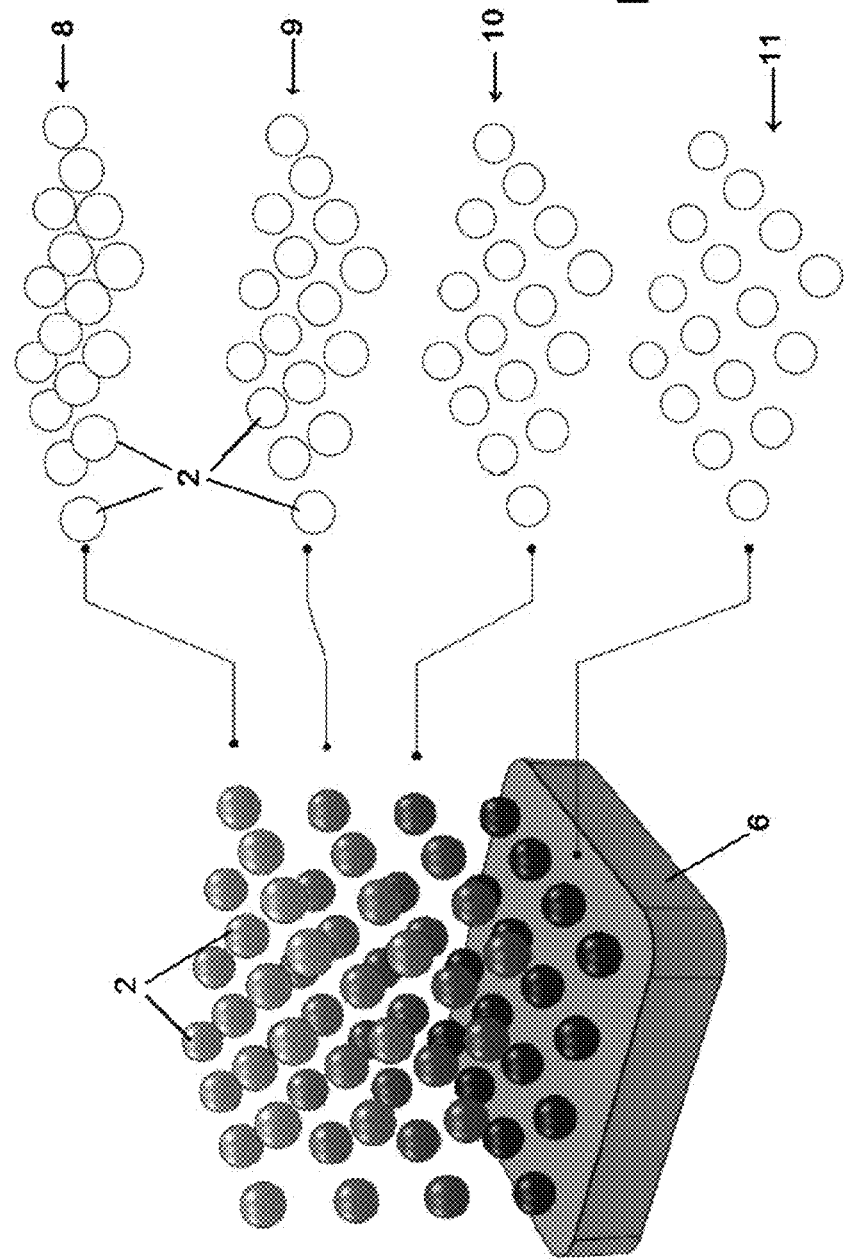

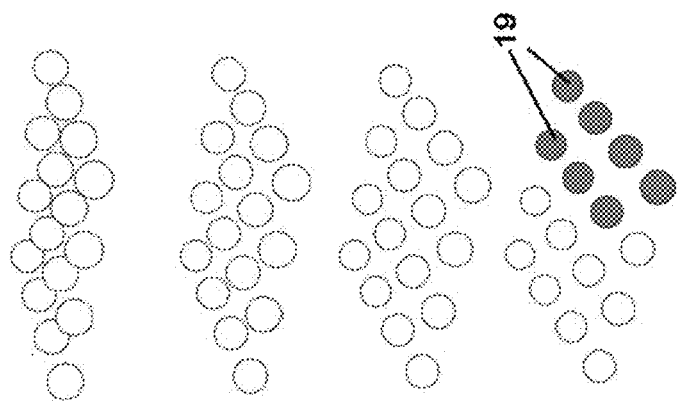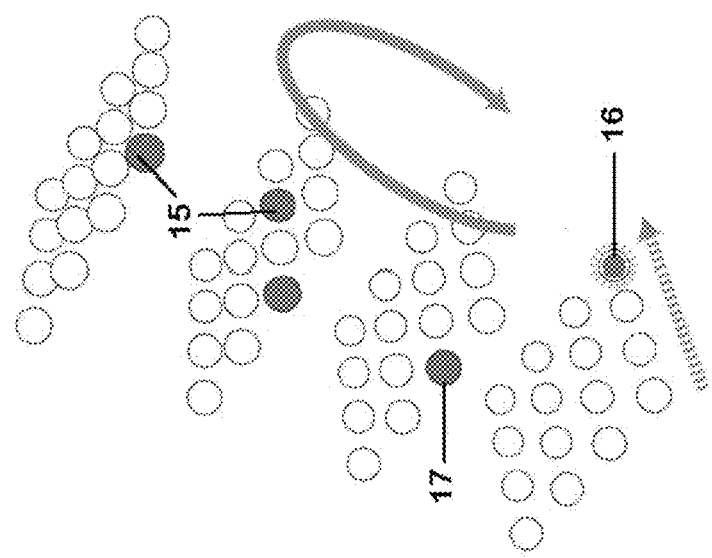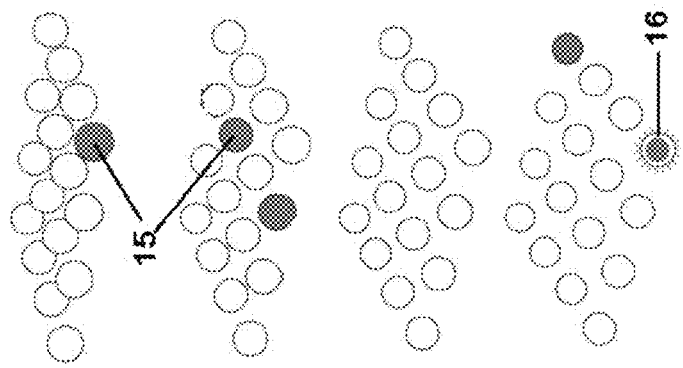

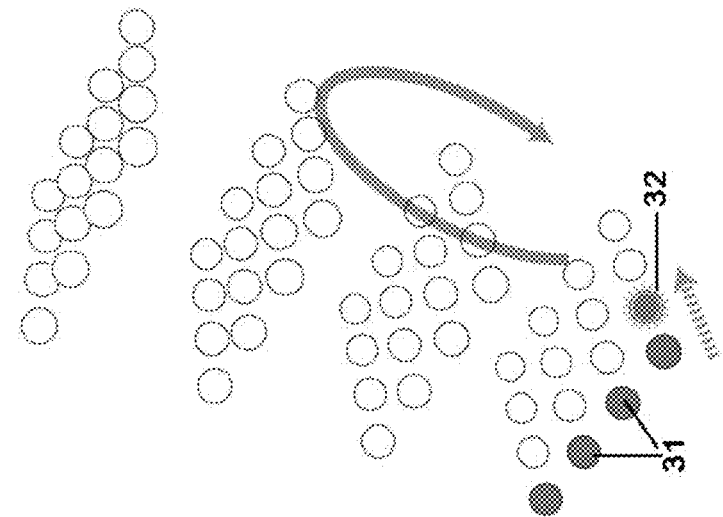
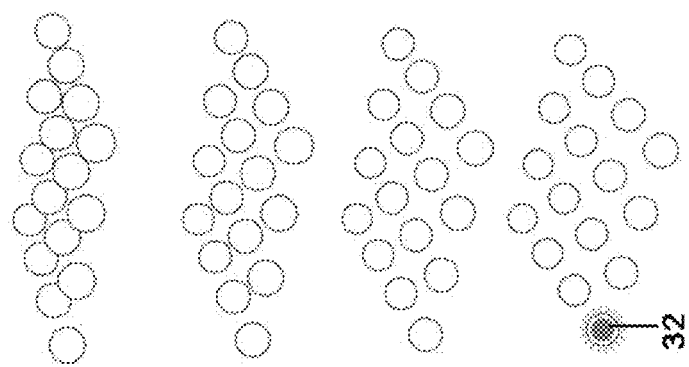
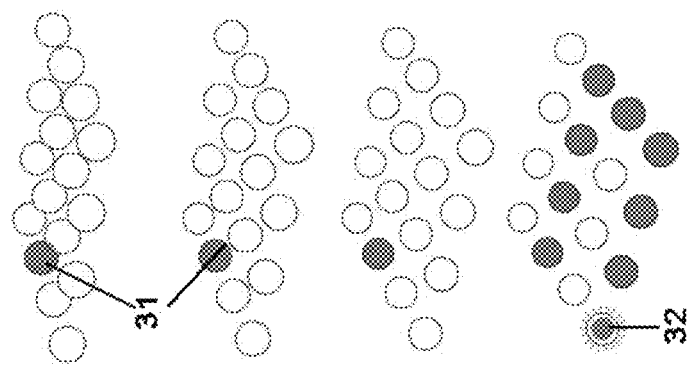
FIG 7c
FIG 7b
FIG 7a

THREE DIMENSIONAL LAMP ARRAY GAME SYSTEM

RELATED APPLICATION

This application claims priority from our provisional application 61/623,062 filed Apr. 11, 2012, the disclosure of which is incorporated herein by reference

FIELD OF THE INVENTION

The invention relates to a game system in which lamps of a three-dimensional lamp array are successively illuminated or extinguished in response to player input.

BACKGROUND OF THE INVENTION

Various prior art game systems produce periodic flashing lamps and sounds in response to player input, for example arcade games such as pin ball machines, and have been well known and very widely used world wide for many years. However, in general, in such arcade games systems, the lamps form an essentially two-dimensional display, while the entire system is relatively massive and must be kept stationary in operation or will abruptly shut down if the game system housing is tilted or jogged during play.

SUMMARY OF THE INVENTION

According to one aspect, an object of the invention is to provide a game system which contrasts with such prior game systems in providing individual lamps positioned in a three-dimensional array, which is hand-carried and manipulable by the player as by tilting or jogging to alter the visible operating states of the lamps in response to such player input.

According to one aspect, the invention comprise a light-displaying game apparatus/system comprising a 3 dimensional LED array driven by electronic control circuitry including a game programmable processor in response to player input to illuminate or extinguish one or more LEDs successively/continually according to rules of a selected game program.

Preferably, the game apparatus further comprises a hand-held housing containing the LED array and having one or more LED viewing windows with transversely extending portions, facets or panes enabling the LED array to be viewed from different angles.

The housing may comprise an opaque housing base portion containing control circuit elements responsive to hand produced position movement of the housing to select/initiate a game program, game move sequence or player's move to light or extinguish one or more LEDs.

For example, in the game apparatus individual lamps (LEDs in diffusers) of the array are strung in a wire matrix of interconnecting rows (forming layers) and columns; the housing is cubic having five upper sides of clear plastic upstanding from an opaque, hand-held base containing a 3-D inclinometer in the base; an integrated circuit including a combined sound chip and microprocessor, speaker, battery power supply and on/off switch are mounted in a second, separate housing (not seen) and, a ribbon cable is connected between the housings to power the inclinometer and LEDs and to relay tilt status signals from the inclinometer to the microprocessor and to power the LEDs, sound chip and speaker in response to signals therefrom.

In a preferred embodiment, the integrated circuit including a combined sound chip and microprocessor, speaker, battery power supply and on/off switch are all housed in the base instead of in a second housing, providing a compact, hand-held, self-contained single unit.

The game apparatus is known as Cubez (or with a phonetically similar spelling)

The array may be asymmetrical or symmetrical, for example, an n×n×n array where n>1 or n×n×y where n=2 and y>2.

The lamps can be all the same color, a mix of colors with each LED a single color, or could be bi-color or tri-color LEDs Differentiating operating states of one or more LEDs may be flickering/blinking/flashing or dimming, or if using multi color LEDs by changing to different colors.

A diverse choice of games may be implemented including one or more combinations of the following:
  Action games
  Skill games
  Timed games
  Seek and Destroy games
  Music plays
  Memory games
  One or more Cubez may interact with each other
  Cubez may interact with smart phones, I-Pads, computers
  May include game cartridges
  May enable games to be downloaded from the internet.
  The game system may enable player input from:
  A 3-D inclinometer mechanical tilt (gravity) switch or (3-D) solid state gyro chip
  A solid state accelerometer/shake chip
  A microphone input
  Mechanical pushbuttons or switches
  Pressure switches

BRIEF DESCRIPTION OF THE DRAWINGS

In order that the invention may be readily understood, embodiments thereof will now be describe with reference to the accompanying drawings in which:

FIG. 4 is a schematic showing discrete layers of LEDs in the interior of the display housing positioned above a housing base;

FIGS. 5a-5c are schematic views showing successive steps of a "Seek and Destroy" game;

FIG. 7a-7c are schematic views showing successive steps of a "Follow the Path" game.

DESCRIPTION OF PARTICULAR EMBODIMENTS

Figure 1:
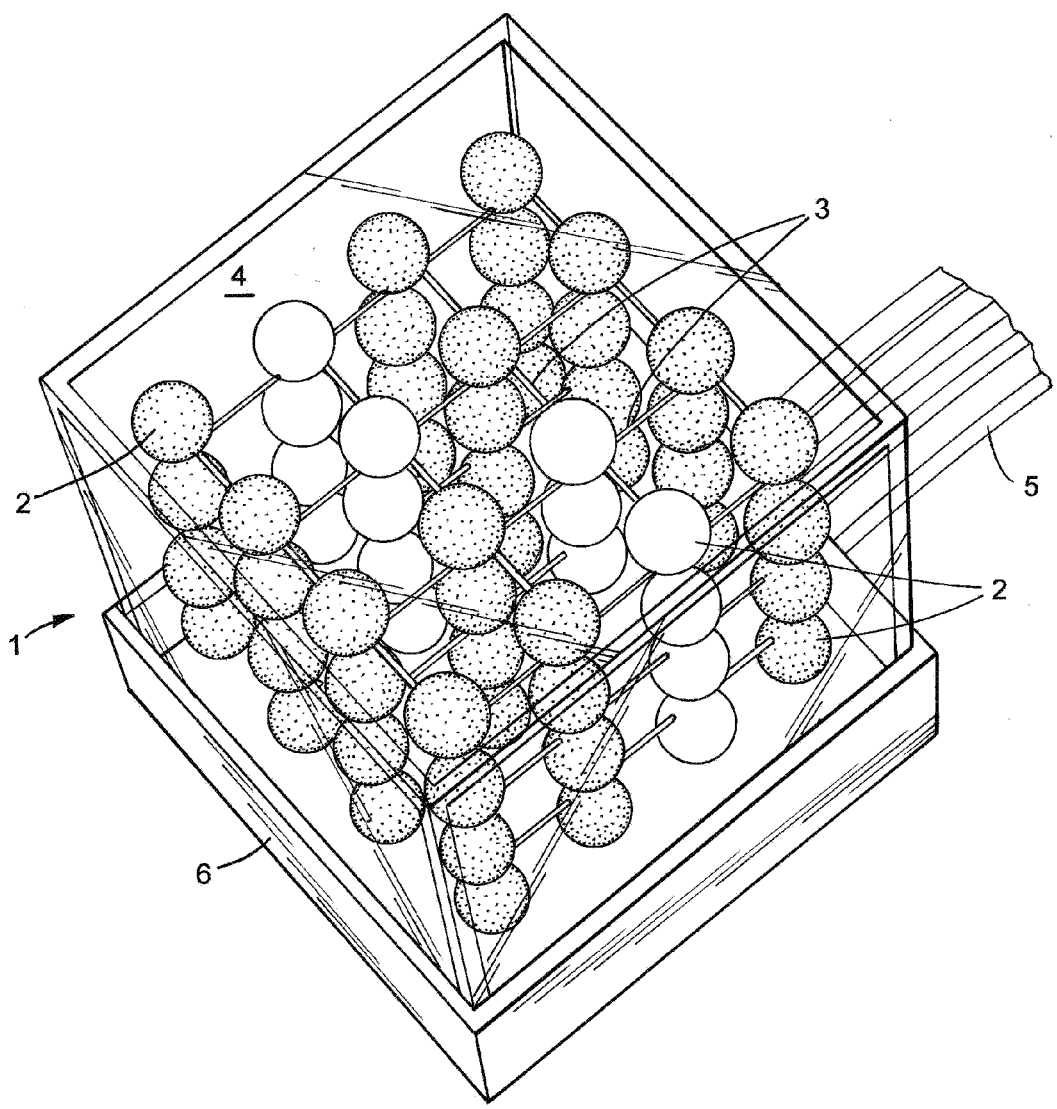
FIG. 1 is a screen shot of the display housing of the first embodiment of game apparatus resting on a table with a section of ribbon cable which provides LED lighting signals from a controller (not shown)
Figure 2:
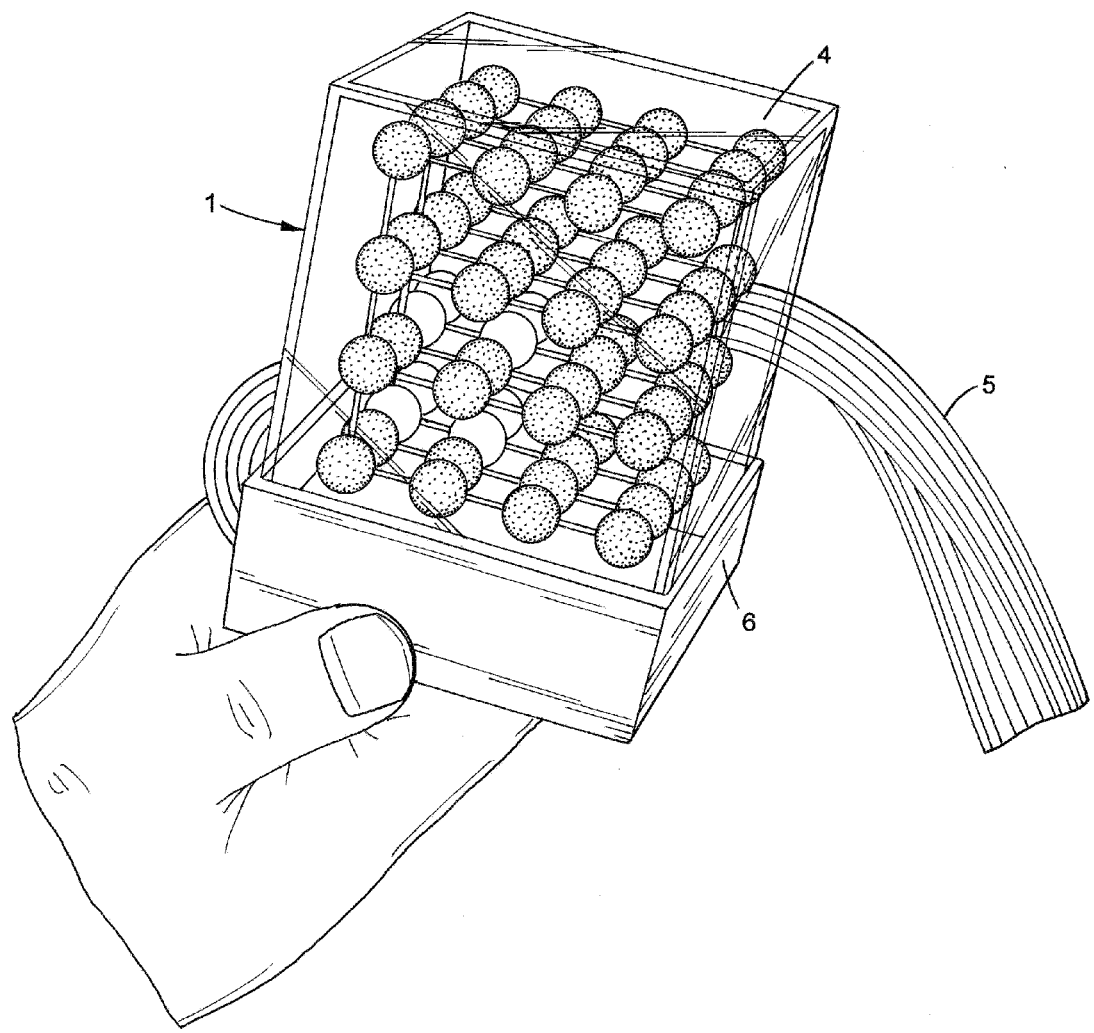
FIG. 2 is a screen shot of display housing held by a user's hand.
Figure 3:
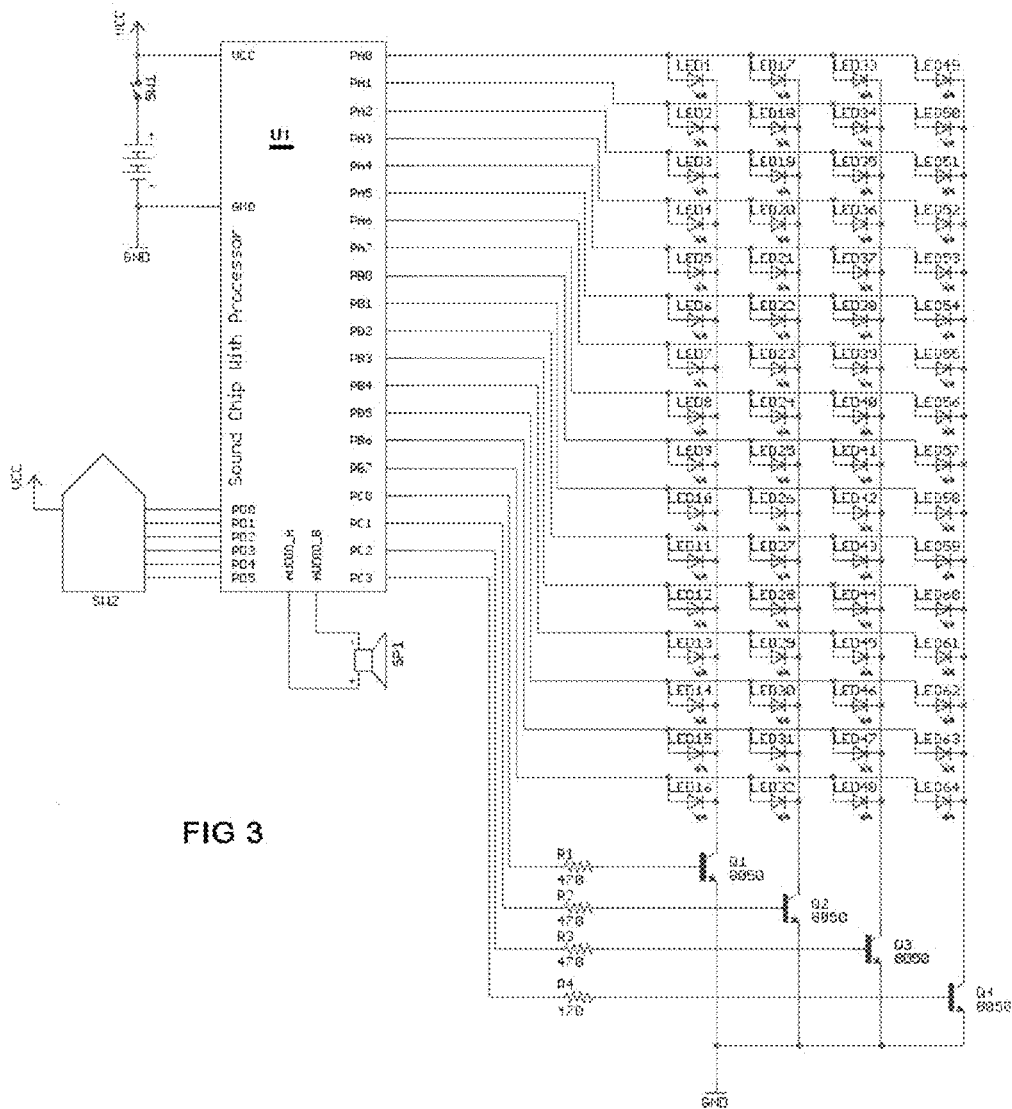
FIG. 3 is schematic circuit diagram of the game apparatus.

The display apparatus 1 comprises a 3-D, 4×4×4 cubic array of LED lamps 2 supported by a lead/wire matrix 3 in connecting rows and columns in a upper transparent portion 4 of a cubic housing 5. The housing has five upper faces/sides or panes of clear plastic upstanding from an opaque, hand-held base 6 containing a 3-D inclinometer/tilt switch SW2 (FIG. 3). As also shown in FIG. 3, an integrated circuit including a combined sound chip and processor U1, a speaker SP1, battery power supply and on/off switch SW1 are mounted in a second, separate housing (not shown) and, a ribbon cable 5 connects the housings to power the inclinometer and LEDs and to relay tilt status signals from the inclinometer to the processor and to power the LEDs, sound chip and speaker in response to signals therefrom.

In a preferred alternative embodiment, all components are contained in the base.

The LEDs are wired, (by soldering leads together supplemented by 23 gage solid wire) as 4 layers, each of 16 LEDs, as best seen in shown in FIG. 4 and scanned/refreshed such that only one layer is actually illuminated at a time. Since this scan/refresh rate is about 100 times per second, the persistence of vision effect causes the illusion that any number in the same or different layers can be on at the same time.

Referring to the schematic circuit diagram FIG. 3, chip U1 is an 8 bit processor with built in sound generating capability. Power is supplied to U1 from the batteries through the On/Off switch SW1.

The processor U1 preferably, has sufficient current drive on outputs to provide approximately 30 ma of current source out of each of the 16 pins which are connected to the LEDs. In the event that a selected processor does not have enough drive capability, then an (optional) LED driver can be utilized. This can be either a single chip capable of having 16 bits of drive, or two 8 bit chips. It can also be implemented with 16 discrete transistors. The solution is dependant on the most cost effective design.

The processor has 8, 8 bit bytes assigned to hold the data (hereafter called "Data Bytes") that is displayed on the LEDs. This is a total of 64 bits, one for each LED. A "1" indicates the LED should be On, and a "0" indicates the Off state. An interrupt driven routine runs the following in the background:

1. Sets outputs PC0, PC1, PC2, PC3 to "0", thus turning off Q1, Q2, Q3, Q4 so no current can flow through any LEDs.
2. Outputs Display Data Byte 1 to PA0-PA7 and Data Byte 2 to PB0-PB7.
3. Sets PC3 to "1" thereby sending current through resistor R1, turning on transistor Q1 and enabling current to flow through any Layer1 LED (LED1-LED16) that has a "1" on it's associated PA or PB line, thereby illuminating it.
4. Waits 1/400 th of a second
5. Sets outputs PC0, PC1, PC2, PC3 to "0", thus turning off Q1, Q2, Q3, Q4 so not current can flow through any LEDs.
6. Outputs Display Data Byte 3 to PA0-PA7 and Data Byte 4 to PB0-PB7.
7. Sets PC2 to "1" thereby sending current through resistor R2, turning on transistor Q2 and enabling current to flow through any Layer2 LED (LED17-LED32) that has a "1" on it's associated PA or PB line, thereby illuminating it.
8. Waits 1/400 th of a second
9. Sets outputs PC0, PC1, PC2, PC3 to "0", thus turning off Q1, Q2, Q3, Q4 not current can flow through any LEDs.
10. Outputs Display Data Byte 5 to PA0-PA7 and Data Byte 6 to PB0-PB7.
11. Sets PC1 to "1" thereby sending current through resistor R3, turning on transistor Q3 and enabling current to flow through any Layer3 LED (LED33-LED48) that has a "1" on it's associated PA or PB line, thereby illuminating it.
12. Waits 1/400 th of a second
13. Sets outputs PC0, PC1, PC2, PC3 to "0", thus turning off Q1, Q2, Q3, Q4 so not current can flow through any LEDs.
14. Outputs Display Data Byte 7 to PA0-PA7 and Data Byte 8 to PB0-PB7.
15. Sets PC0 to "1" thereby sending current through resistor R4, turning on transistor Q4 and enabling current to flow through any Layer4 LED (LED49-LED64) that has a "1" on it's associated PA or PB line, thereby illuminating it.
16. Waits 1/400 th of a second
17. Returns to #1

The main part of the software routine running in the chip U1, reads SW2, a six position tilt switch, which indicates the orientation/inclination of the cube as determined by the user. The routine uses that user input to modify the data in the Display Data Bytes thereby producing a desired game play.

In a Seek and Destroy game, shown in FIGS. 5a-5c, randomly selected LEDs 15 (shaded), appear to be lit/glow constantly as "targets" and the player moves his position (cursor) indicated by a flashing/blinking LED 16 (starburst), progressively towards that "target" by tilting the cube in different orientations until the flashing LED 16 reaches a constantly glowing LED 15, extinguishing and therefore destroying it.

At the start shown in FIG. 5a, four "target" LEDs at random locations are driven to glow with a continuous/solid light and a 30 second timer starts. The player's LED 16 in the lower right corner of the cube is set flashing. As the user tilts the cube in any of the six possible orientations which cause one of it's six 6 sides faces to be oriented downward, the next downwardly positioned adjacent LEDs are sequentially set flashing one at a time and the previously flashing LEDs extinguished successively/one at a time, so that the player's position, indexes one LED at a time toward that downward face, simulating an action that the player's flashing LED is actually traveling by "flowing" or "spilling" toward the (most) downward face. At each predetermined time period, (approximately ½ second), the processor polls SW2 to detect the current orientation, extinguishing the LED in the current position, and lighting (flashing) the LED in the next lower position by changing the appropriate bits in the Data Bytes. The processor also checks to see if any next position is occupied by a "target" (continuously illuminated) LED and, if so, when the player is indexed thereto generates a 'kill' sound, replaces the constant glow by a flashing state until further indexing the player's position away from the position of the killed target LED when it extinguishes the 'killed' target LED.

When the Player's position, as indicated by the flashing LED, has reached the bottom of the column (housing cube edge) in the direction it is commanded to move, no further movement/action occurs. Movement to an orthogonal row is produced by turning the cube to orientate an adjacent face downward, thereby altering the row into a column. As shown in FIG. 5b, once one or two targets have been destroyed, (or only 2 "targets" remain), a new target 17 (or two new targets) are added at random location (s), but such that none are in the current location of the "Player LED". This maintains between 2 and 4 "targets" at all times. The game ends when the predetermined game time (30 sec) has been reached as determined by the software timer when, as shown in FIG. 5c, all LEDs are extinguished/turn off except for a group 19 which are lit up to show the score represented by the total number of "targets" destroyed (7).

Sounds associated with the game action can be played by U1 through speaker SP1.

Figure 6A:
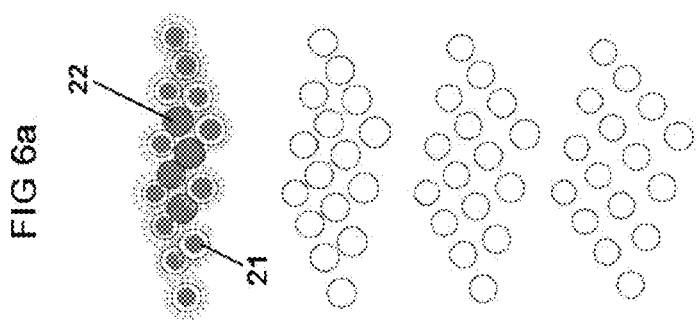
FIGS. 6a-6c are schematic views showing successive steps of a "Freestyle DJ" game/activity.
Figure 6B:
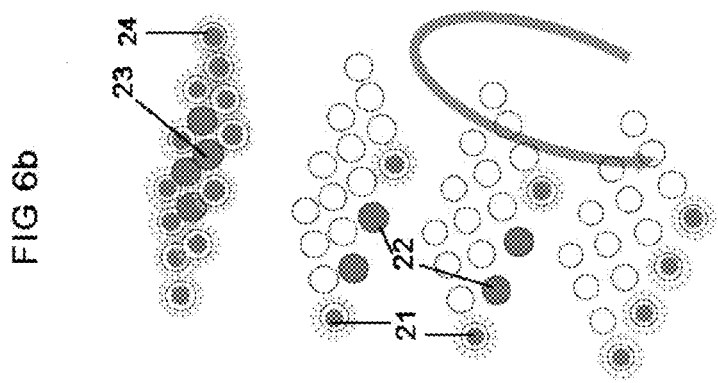
Figure 6C:
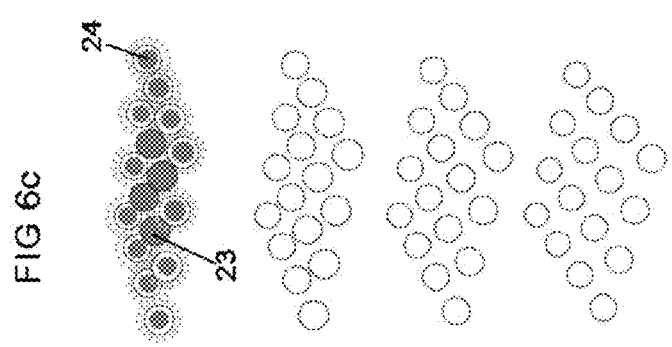
Figure 6D:
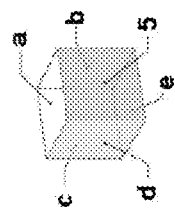
FIG. 6d identifies various faces/sides of the cubic housing for reference purposes in game explanation.

In another game called Freestyle DJ shown in FIGS. 6a-6d, music is activated based upon the timing and orientation of the housing. In one implementation, each of 6 musical RIFFs played by different instruments are associated with a different side/face. For example, as shown in FIG. 6d side/face a=Drum Beat (A); side b=piano keyboard sequence (A); side c=piano keyboard sequence (B); side d=guitar sequence (A); side e=guitar sequence (B); and side f=drum beat (B). Orienting the cube with a particular face upward, starts the RIFF associated with that face and illuminates some or all of the LEDs on/adjacent that face with the inner LEDs 22 lit continuously and the outer LEDs 24 flashing such as a "Drum Beat", shown in FIG. 6a. It remains playing for 5 seconds, then stops, and those LEDs are extinguished. When, as shown in FIG. 6b, the cube is rotated to a new face up position before the 5 seconds are up, that new RIFF "Piano Keyboard" lighting up all LEDs 23 (continuously) and 24 (flashing) begins, playing along with the last one.

As shown in FIG. 6c, after 5 seconds, the drum beat fades away and only the Piano Keyboard lights and music remain. This enables the player to create music based upon orienting the cube. The light show, (illuminating individual LEDs or a group), is synchronized with the music.

Up to six RIFFs can be heard playing at the same time, when the cube is re-oriented sufficiently quickly.

As shown in FIGS. 7a-7c, another, memory game, is implemented by continuously illuminating a series of LEDs 31 to define a path, as shown in FIG. 7a and, the LEDs are then extinguished, as shown in FIG. 7b. As shown in FIG. 7c, the player then attempts to retrace that path with the flashing cursor LED 32 by continually changing the orientation of the cube, as sensed by tilt switch SW2 using essentially the same algorithm used in the Seek and Destroy game. Both the number of times the player successfully lands on the correct path, and the player deviates from the path, are stored by the processor. Once a maximum number of errors have occurred, the game is over and the score, (number of successful path hits), is displayed.

In yet another game called "Fill In The Gap", in a first round, all but one LEDs are lit up for 1-2 seconds, after which all except the blinking cursor light turn off. The player tilts and manipulates the apparatus (cube housing) to maneuver the cursor light to that originally unlit lamp/LED location and remain for 1.5 seconds when the spot is registered and all other LEDS are lit up continuously. If the cursor remains in any other location for 1.5 seconds, the game ends.

In a second round, at the start, two lamps remain unlit when all others are lit and, the player is required to land the cursor on both those unlit, each for 1.5 seconds In a third round, three spots remain unlit when all others are lit at the start and the player is required to land on all three.

In each successive round, one more remains unlit at the start, possibly up to 13 or so.

A subjective attraction of the game is the slight hint of RUBIK cube play.

Game selection can often be accomplished by assigning each game to a particular face, and tilting the cube in that direction at startup. (Not for Freestyle DJ)

Switch SW2 is, alternately, an accelerometer, responding to the initiation of movement (jerking, shaking, tapping) by the user.

Other input means could be used such as a joystick or push buttons.

Figures 8A, 8B:
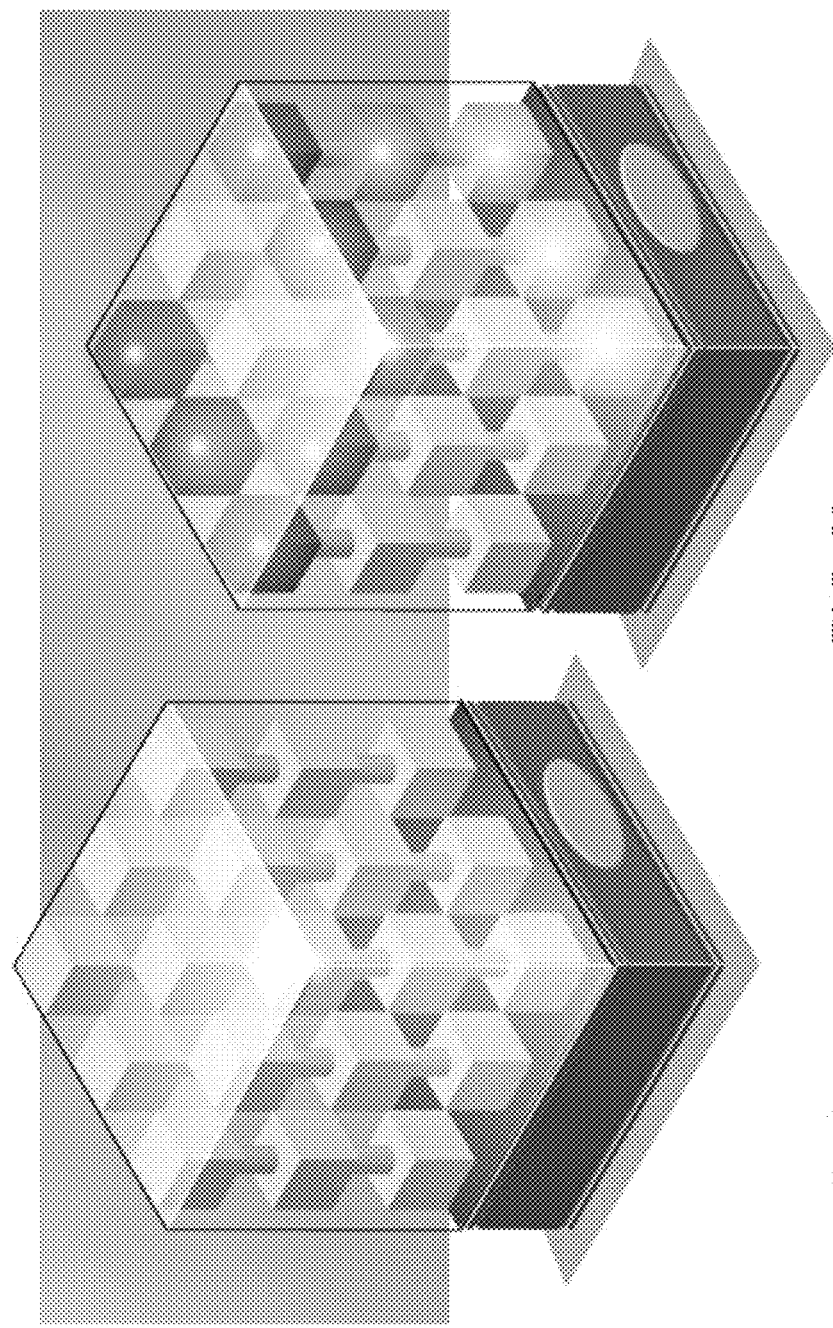
FIGS. 8a and 8b are perspective views of another embodiment of game apparatus.

Another embodiment of game apparatus, shown in FIGS. 8a and 8b, consists of a 3×3×3 matrix with LED lamp diffusers which are cubic. Three individual LED chip sets are mounted at equal intervals along a narrow circuit board strip and then encapsulated by joining plastic half shells together to completely enclose them. Each half shell consists of three half-cubes linked by hemi-cylindrical portions between them.

A similar construction employing half shells using hemispheres linked by hemi-cylindrical portions between them could be used for the spherical diffusers.

Figure 9:
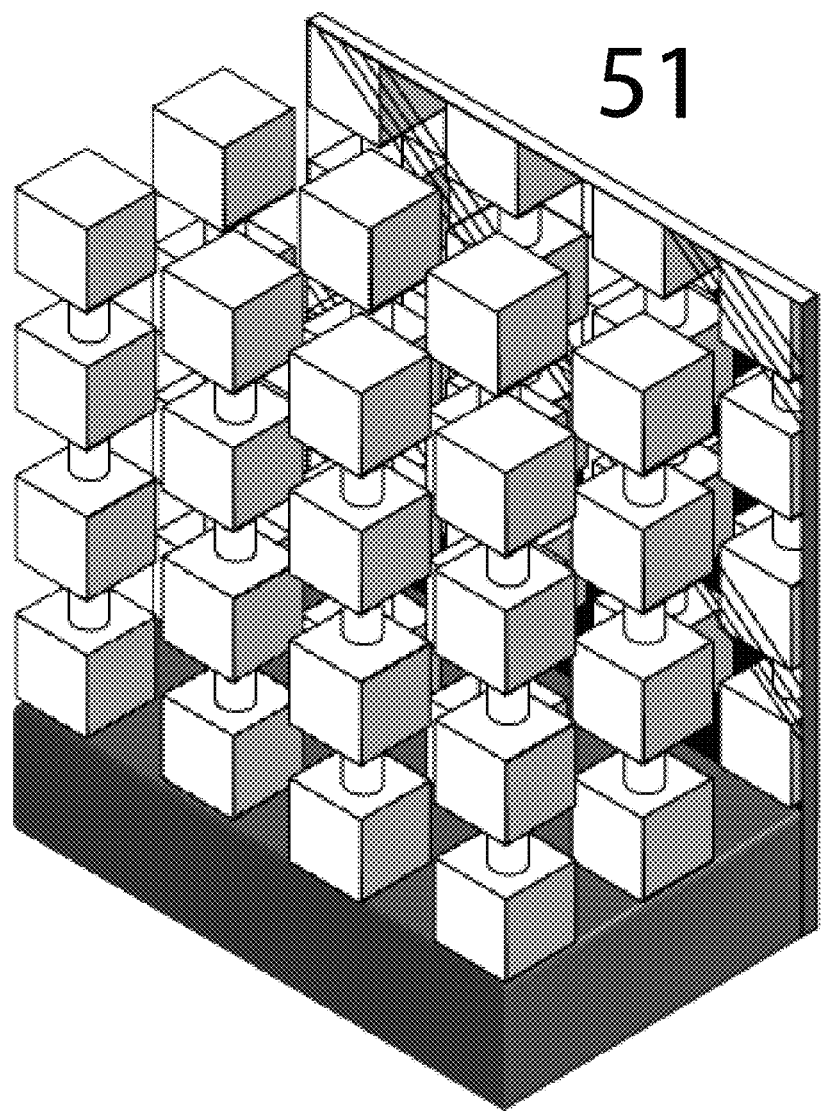
FIG. 9 is a perspective fragmentary view of another embodiment with the transparent housing portion removed to show a mirror as one face, the reflection of which enables the number of lamps to be reduced by 50%.

This approach affords reduced production costs in another embodiment shown in FIG. 9, a (vertical) mirror 51 is employed as one face of the previously transparent portion of the housing, to reflect the lamps, providing the illusion that there are twice as many lamps in the array, enabling a reduction of 50% in the number of lamps actually required, with consequential cost savings.

It will be appreciated that the term operating state includes different levels and types of illumination including zero/no illumination, different shades, colors or frequencies of illumination such as blinking/flashing, etc.

The invention claimed is:

1. A light-displaying game system comprising:
a hand-held lamp housing;
a lamp display comprising a three-dimensional array of individual lamps supported by the housing;
means for providing output signals in response to player input;
electronic control circuitry including a game-programmed processor connected between said means and the lamp array to control visible operating states of individual lamps of the array in response to the output signals, according to rules of a game program on the processor,
wherein said means comprises one of a three-dimensional inclinometer and a three-dimensional accelerometer in the housing providing the output signals in response to player manipulation of the housing, and
wherein said one of an inclinometer and accelerometer is an inclinometer and a game program initially causes the control circuitry to place a first lamp in a first, cursor forming, operating state which is visibly different than a second operating state of at least one, next adjacent lamp and, when a player tilts the housing to a first inclination in which one of said at least one next adjacent lamp is positioned at a different level from the first lamp, causes the control circuitry to change, sequentially, respective individual operating states of respective successive next adjacent lamps in a direction of the inclination to the first operating state and, to simultaneously change the respective operating states of each lamp having a state previously changed to the first operating state back to the second operating state, providing the impression that the cursor is traveling in the direction of the inclination.

2. A game system according to claim 1 wherein the lamp housing comprises transversely extending window portions which enable the lamp array to be viewed from different angles.

3. A game system according to claim 1 wherein the hand-held lamp housing comprises an opaque housing base portion containing said means, the electronic control circuitry; a sound chip and speaker responsive to the output signals according to the rules of the game; a timer; and, a battery, forming a self-contained unit.

4. A game system according to claim 1 wherein the lamp array is cubiform, comprising interconnecting horizontal rows and vertical columns of individual lamps, the cursor being transferrable between a row and a column by turning the housing through 90 degrees and the lamp housing comprises transversely extending window portions which enable the lamp array to be seen from different angles.

5. A game system according to claim 4 wherein the housing is cubic having five faces of clear plastic upstanding from the base and surrounding the lamp array.

6. A game system according to claim 1 wherein the game program causes the control circuitry to place at least one lamp, spaced apart in the array from the first lamp, in a third operating state, visibly different from the first operating state and the second operating state and providing at least one target and to change the operating state of the target lamp and register a hit when the cursor is maneuvered to reach the target lamp by tilting the housing.

7. A game system according to claim 6 wherein the first, cursor forming, operating state is flashing light, the second operating state is relative darkness and, the third operating state is continuous light.

8. A game system according to claim 1 wherein the lamps comprise LEDs.

9. A light-displaying game system comprising:
a hand-held lamp housing;
a lamp display comprising a three-dimensional array of individual lamps supported by the housing;
means for providing output signals in response to player input;
electronic control circuitry including a game-programmed processor connected between said means and the lamp array to control visible operating states of individual lamps of the array in response to the output signals, according to rules of a game program on the processor,
wherein said means comprises one of a three-dimensional inclinometer and a three-dimensional accelerometer in the housing providing the output signals in response to player manipulation of the housing,
wherein the direction of the inclination is down, so that the cursor travels downhill, and
wherein the game program causes the control circuitry to momentarily change an operating state of a series of aligned lamps to be visibly different from other lamps in the array thereby momentarily defining a visible pathway extending through the array and, after reversion of the series of aligned lamps to their original operating state obscuring the pathway, a player attempts to make the cursor retrace the pathway by tilting the housing, and the game program causes the controller to register a score reflecting both a number of times the cursor lands on a lamp of the series defining the pathway and the number of times the cursor lands on a lamp not defining the original parkway.

10. A game system according to claim 9 wherein the lamp array and the lamp housing are both cubiform, comprising interconnecting horizontal rows and vertical columns of individual lamps, the cursor being transferrable between a row and a column by turning the housing through 90 degrees and wherein, different games are assigned to respective different faces of the housing so that titling the housing in the direction of a particular face selects the game assigned to the particular face.

11. A light displaying game system comprising:
a hand-held lamp housing;
a lamp display comprising a three-dimensional array of individual lamps supported by the housing;
means for providing output signals in response to player input;
electronic control circuitry including a game-programmed processor connected between said means and the lamp array to control visible operating states of individual lamps of the array in response to the output signals, according to rules of a game program on the processor,
wherein said means comprises one of a three-dimensional inclinometer and a three-dimensional accelerometer in the housing providing the output signals in response to player manipulation of the housing, and
including a sound chip, speaker and timer,
wherein a plurality of programs for producing different musical riffs are stored on the microprocessor and the game program causes the processor to activate the sound chip and speaker to generate a different one of the riffs and to change the visible operating states of lamps in response to inclinometer output determined by housing orientation, and
wherein the lamp housing comprises transversely extending transparent portions exposing correspondingly different portions of the lamp array to the player at respectively different, player selected, angles of view; and
wherein, for a predetermined duration measured by the timer, the game program causes the sound chip to generate different riffs for respectively different transparent portions at the selected angle of view and causes the controller to change the visible operating states of lamps of the array which are most visible at the selected angle of view; and turning the housing to select a different housing portion at a different angle of view, generates a different riff associated with that portion and changes the visible operating states of lamps which are most visible at the selected, different angle of view while stopping the riff and changing back the visible operating states of those lamps on the face on portions of the display at the selected previous angle of view.

12. A game system according to claim 11 wherein lamp array is cubiform comprising different faces and comprises interconnecting horizontal rows and vertical columns of individual lamps, the lamp housing is cubic and surrounds the lamp array with uppermost and adjacent faces being transparent, the selected angle of view corresponding to an uppermost face/transparent portion exposing a transparent portion/face which is uppermost.

13. A game system according to claim 12 wherein the visible operating states of the lamps include flashing light and continuous light.

14. A game system according to claim 11 wherein different riffs emphasize respectively different musical instruments.

15. A light displaying game system comprising:
a hand-held lamp housing;
a lamp display comprising a three-dimensional array of individual lamps supported by the housing;
means for providing output signals in response to player input;
electronic control circuitry including a game-programmed processor connected between said means and the lamp array to control visible operating states of individual lamps of the array in response to the output signals, according to rules of a game program on the processor,
wherein said means comprises one of a three-dimensional inclinometer and a three-dimensional accelerometer in the housing providing the output signals in response to player manipulation of the housing, and
wherein, in a first round, initially, a game program causes the control circuitry to turn/light up on all but one lamp continuously for only a 1-2 seconds, and then to turn off all lamps and to cause another lamp to flash/blink, providing a cursor, and, tilting the housing to a first inclination in which a next adjacent lamp is positioned at a different level from the first lamp, causes the control circuitry to turn on sequentially, respective successive next adjacent lamps in a direction of the inclination to a flashing state and, to simultaneously turn off each previously flashing lamp, providing the impression that the cursor is traveling in the direction of the inclination so that a player can, by tilting the housing, maneuver the cursor to that one unlit lamp location and to remain flashing for 1-2 seconds wherein the program causes that lamp to be registered for a score and all other lamps to be lit up continuously, while if the cursor remains at any other lamp for 1-2 seconds, the game ends; and, wherein during successive subsequent rounds, initially at each round, incrementally increasing numbers of lamps remain unlit while all others are lit and, the player is required to land the cursor on each originally unlit lamp, each for 1-2 seconds.

* * * * *